United States Patent Office.

GEORGE LUPTON, OF INDIANAPOLIS, INDIANA.

Letters Patent, No. 110,054, dated December 13, 1870.

IMPROVEMENT IN PURIFYING BENZINE.

*The Schedule referred to in these Letters Patent and making part of the same.*

*To all whom it may concern:*

Be it known that I, GEORGE LUPTON, of Indianapolis, in the county of Marion and State of Indiana, have invented a new and improved Process for Purifying the Ordinary Benzine of Commerce; and I do hereby declare that the following is such a full, clear, and exact description thereof as to enable those skilled in the art to practice the same.

This improvement relates to the manner of purifying the ordinary benzine of commerce, which is generally in a more or less impure state when put upon the market; and My invention consists in a process by which the purchaser of such an impure article can purify the same, as will be more fully explained hereinafter.

Various methods are adopted at the manufactories for purifying benzine; one, and perhaps the most common one, is to place a large quantity in a tank lined with lead, to which about five per cent. of sulphuric acid is added, after which the mass is agitated for some time and then left to settle, when the acid is drawn off from the bottom of the tank.

When the process has been carried to this point, a stream of water is turned into the tank, and the contents are washed, after which potash is sometimes used, with the intention of neutralizing the sulphuric acid.

Owing to the fact that large quantities are treated at one time, it is found that whether the above process or any other now in use be resorted to, a sufficient quantity of the acid remains to render the article capable of destroying iron vessels in which it may be stored, and also that enough of the sulphuric acid remains to render it very offensive while being burned.

My improved process for purifying this article is designed to remove the above referred to objections and furnish a means by which the retail dealers can purify the impure article before supplying it to their customers, as contradistinguished from the processes used in the manufactories.

In practice. I use benzine as a base, in combination with hydrated sesquioxide of iron, hydrate of lime, chloride of barium, carbonate of soda, and paraffine.

By the use of hydrated sesquioxide of iron and hydrate of lime, sulphuretted hydrogen, and carbonic-acid gas, which are so detrimental to health and life, and which diminish the brilliancy of the light, are effectually removed.

Chloride of barium forms an insoluble chemical compound with the sulphuric acid contained in the fluid, which compound settles to the bottom, thereby preventing the burning of the acid with the fluid, which would vitiate the atmosphere.

Carbonate of soda neutralizes any nitric acid, which may remain in the benzine after it has been treated in the usual manner, thereby preventing the formation of nitro-benzole.

Paraffine is added to increase the quantity of olefiant gas which contributes so much to the brilliancy of the light.

To prepare the fluid, a barrel or other vessel of sufficient capacity may be used.

To forty (40) gallons of benzine add ten (10) pounds of hydrated sesquioxide of iron, and ten (10) pounds of hydrate of lime. This mixture should be thoroughly agitated and allowed to stand twenty-four hours.

The fluid should then be drawn off and eight (8) ounces of chloride of barium added to it, and the mixture again agitated and allowed to settle. After that one (1) pound of corbonate of soda is thrown in and well mixed with the fluid. Ten (10) pounds of refined paraffine is next dissolved in the fluid, which should stand four or five days before being used.

What I claim as my invention, and desire to secure by Letters Patent, is—

The within-described process for purifying benzine for illuminating purposes, substantially as and for the purpose set forth.

In testimony whereof, I have signed my name to this specification in the presence of two subscribing witnesses.

GEORGE LUPTON.

Witnesses:
D. P. HOLLOWAY,
R. EDW. J. EILS.